(12) United States Patent
Ingles

(10) Patent No.: US 8,473,504 B2
(45) Date of Patent: Jun. 25, 2013

(54) STABILIZED BINARY DIFFERENCING

(75) Inventor: Roger Harry Ingles, NRH, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 13/106,452

(22) Filed: May 12, 2011

(65) Prior Publication Data

US 2012/0290596 A1    Nov. 15, 2012

(51) Int. Cl.
*G06F 7/00* (2006.01)
(52) U.S. Cl.
USPC .......................................................... 707/758
(58) Field of Classification Search
USPC ... 707/695, 758, 692, 694, 999.203; 717/168, 717/170, 171; 382/282
See application file for complete search history.

(56) References Cited

U.S. PATENT DOCUMENTS

| | | | |
|---|---|---|---|
| 7,661,102 B2 * | 2/2010 | Ogle | 717/168 |
| 7,739,679 B2 * | 6/2010 | Qumei | 717/170 |
| 8,055,096 B2 * | 11/2011 | Dahms et al. | 382/282 |
| 2004/0260734 A1 | 12/2004 | Ren et al. | |
| 2007/0079306 A1 * | 4/2007 | Qumei | 717/168 |
| 2007/0169082 A1 | 7/2007 | Lam et al. | |
| 2010/0306756 A1 * | 12/2010 | Scian et al. | 717/168 |

* cited by examiner

*Primary Examiner* — Hung T Vy
(74) *Attorney, Agent, or Firm* — Jefferson IP Law, LLP

(57) ABSTRACT

An apparatus and method for stabilized binary differencing are provided. The method includes obtaining a first report file for a first image corresponding to a current firmware version and a second report file for a second image corresponding to an updated firmware version, each report file containing information about a plurality of sections of the corresponding image, generating a first object array corresponding to the first report file and a second object array corresponding to the second report file, comparing the first object array to the second object array, updating the second object array to reflect the results of the comparison, generating a steering file based on the updated object array, performing a binary differencing on the first image and the second image based on the steering file, and generating a delta file based on the binary differencing.

16 Claims, 5 Drawing Sheets

MEMORY MAP OF THE IMAGE

IMAGE ENTRY POINT: 0x0000005d

LOAD REGION PATENT_DEMONSTRATION (BASE: 0x00000000, SIZE: 0x00000098, MAX: 0x05000000, ABSOLUTE)

EXECUTION REGION MIDDLE (EXEC BASE: 0x00000000, LOAD BASE: 0x00000000, SIZE: 0x00000024, MAX: 0xFFFFFFFF, ABSOLUTE)

| EXEC ADDR | LOAD ADDR | SIZE | TYPE | ATTR | IDX | E SECTION NAME | OBJECT |
|---|---|---|---|---|---|---|---|
| 0x00000000 | 0x00000000 | 0x00000004 | CODE | RO | 1.0.1 | !!!SCATTER | ALPHA.O(ALPHA.AR) |
| 0x00000004 | 0x00000004 | 0x00000016 | CODE | RO | 1.0.2 | .TEXT | ALPHA.O(ALPHA.AR) |
| 0x0000001a | 0X0000001a | 0x00000004 | CODE | RO | 1.0.3 | DOUBLES | ALPHA.O(ALPHA.AR) |
| 0x0000001e | 0X0000001e | 0X00000004 | CODE | RO | 1.0.4 | SINGLES | ALPHA.O(ALPHA.AR) |

EXECUTION REGION HUGE (EXEC BASE: 0x00000024, LOAD BASE: 0x00000024, SIZE: 0x00000038, MAX: 0xFFFFFFFF, ABSOLUTE)

| EXEC ADDR | LOAD ADDR | SIZE | TYPE | ATTR | IDX | E SECTION NAME | OBJECT |
|---|---|---|---|---|---|---|---|
| 0x00000024 | 0x00000024 | 0x00000014 | CODE | RO | 2.0.1 | .TEXT | DELTA.O(DELTA.AR) |
| 0x00000038 | 0x00000038 | 0x00000014 | CODE | RO | 2.1.1 | .TEXT | BETA.O(DELTA.AR) |
| 0x0000004c | 0x0000004c | 0x00000004 | CODE | RO | 2.0.2 | DOUBLES | DELTA.O(DELTA.AR) |
| 0x00000050 | 0x00000050 | 0x00000004 | CODE | RO | 2.1.2 | DOUBLES | BETA.O(DELTA.AR) |
| 0x00000054 | 0x00000054 | 0x00000004 | CODE | RO | 2.0.3 | SINGLES | DELTA.O(DELTA.AR) |
| 0x00000058 | 0x00000058 | 0x00000004 | CODE | RO | 2.1.3 | SINGLES | BETA.O(DELTA.AR) |

EXECUTION REGION ROOT (EXEC BASE: 0x0000005c, LOAD BASE: 0x0000005c, SIZE: 0x0000080c, MAX: 0xFFFFFFFF, ABSOLUTE)

| EXEC ADDR | LOAD ADDR | SIZE | TYPE | ATTR | IDX | E SECTION NAME | OBJECT |
|---|---|---|---|---|---|---|---|
| 0x0000005c | 0x0000005c | 0x00000010 | CODE | RO | 3.0.1 | *GENESIS | CALL.O |
| 0x0000006c | 0x0000006c | 0x0000000c | DATA | RO | 3.0.3 | GREETING | CALL.O |
| 0x00000078 | 0x00000078 | 0x00000008 | DATA | RO | 3.0.4 | POINTERS | CALL.O |
| 0x00000080 | 0x00000080 | 0x00000008 | CODE | RW | 3.0.6 | FLASH_CODE_IN_RAM | CALL.O |
| 0x00000088 | 0x00000088 | 0x00000010 | DATA | RW | 3.0.8 | ANSWER | CALL.O |
| 0x00000098 | - | 0x000007d0 | ZERO | RW | 3.0.9 | GALAXY | CALL.O |

| # | OFFSET | RELOCATION TYPE | WRT SYMBOL | DEFINED IN |
|---|---|---|---|---|
| 0 | 0x0000005c | 10 R_ARM_THM_CALL | 33 ALPHA_READMONTH | #1 'MIDDLE' |
| 1 | 0x00000060 | 10 R_ARM_THM_CALL | 37 BETA_READMONTH | #2 'HUGE' |
| 2 | 0x00000064 | 10 R_ARM_THM_CALL | 36 DELTA_READMONTH | #2 'HUGE' |
| 3 | 0x00000068 | 102 R_ARM_THM_JUMP11 | 42 READMONTH | #3 'ROOT' |
| 4 | 0x00000078 | 2 R_ARM_ABS32 | 42 READMONTH | #3 'ROOT' |
| 5 | 0x0000007c | 2 R_ARM_ABS32 | 10 ALIEN | #3 'ROOT' |

FIG. 6

STABILIZED BINARY DIFFERENCING

BACKGROUND OF THE INVENTION

1. Field of the Invention

The present invention relates to an apparatus and method for stabilized binary differencing. More particularly, the present invention relates to an apparatus and method for generating a delta file based on a steering file obtained from a stabilized firmware image.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Typically, a mobile terminal manufacturer prepares the mobile terminal with the necessary firmware to operate the mobile terminal and provides the mobile terminal to carriers for sale to users. To generate the firmware, the mobile terminal manufacturer often employs a linker offered by the manufacturer of the microprocessor controlling the mobile terminal. The linker collects the object code for the program and links them together into a runnable image that can be stored in the memory of the mobile terminal.

Recently, linkers have been modified to output "stabilized" images. According to this modification, when the linker is provided with the same set of object files and archive files in the same sequence, the linker will link the objects together in a highly similar fashion. The output of the linker therefore becomes more "stable" and predictable.

The mobile terminal manufacturer also makes firmware updates available to the users. An update may be necessary to correct bugs, to enhance security, or provide additional features. The updates are typically provided to the users via a delta package. The delta package includes the new or updated code and data in the firmware update, as well as instructions to permit the mobile terminal to update the previously stored firmware. To reduce size, the delta package generally does not include code or data that has not changed in the updated firmware.

However, in order to generate the delta package, the old firmware and the updated firmware need to be compared so that the differences can be identified. This process can be slow and time-consuming. As a result, the schedule for the release of the firmware update to users may be delayed. Accordingly, there is a need for an apparatus and method for providing improved differencing of firmware code and data.

SUMMARY OF THE INVENTION

An aspect of the present invention is to address at least the above-mentioned problems and/or disadvantages and to provide at least the advantages described below. Accordingly, an aspect of the present invention is to provide an apparatus and method for stabilized binary differencing.

In accordance with an aspect of the present invention, an apparatus and method for stabilized binary differencing are provided. The method includes obtaining a first report file for a first image corresponding to a current firmware version and a second report file for a second image corresponding to an updated firmware version, each report file containing information about a plurality of sections of the corresponding image, generating a first object array corresponding to the first report file and a second object array corresponding to the second report file, comparing the first object array to the second object array, updating the second object array to reflect the results of the comparison, generating a steering file based on the updated object array, performing a binary differencing on the first image and the second image based on the steering file, and generating a delta file based on the binary differencing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 shows a partial output of a linker according to an exemplary embodiment of the present invention;

FIG. 6 shows partial relocation information of an image according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
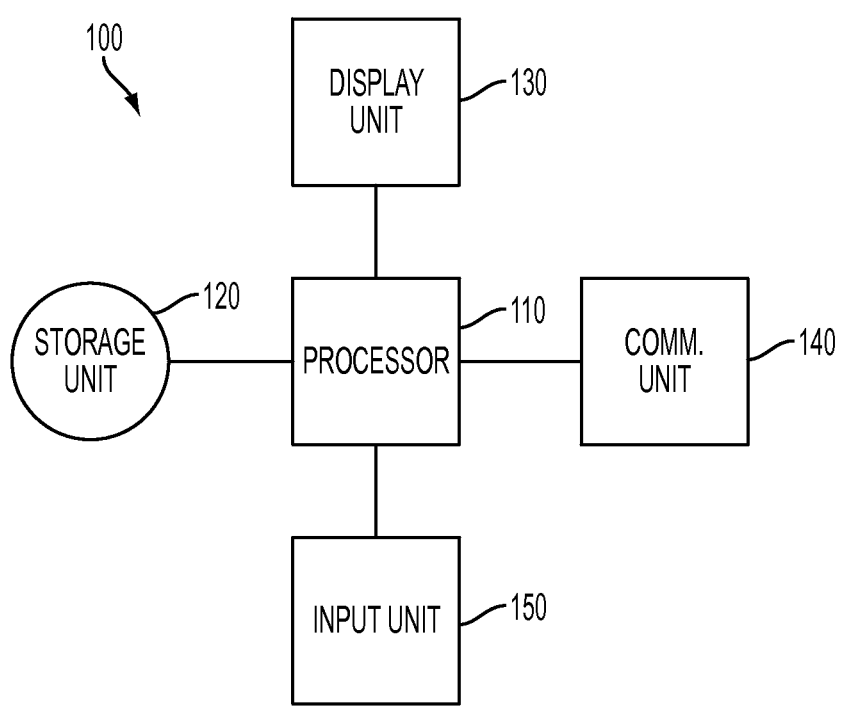
FIG. 1 is a diagram of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal." However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Although the exemplary embodiments of the present invention provided herein are described with reference to a mobile terminal, the exemplary embodiments are not limited thereto. Exemplary embodiments of the present invention may be applied to any device having firmware updateable via a delta file. For example, many home appliances may be equipped with a firmware and wired or wireless interface, such that the home appliance could receive a delta file to update the firmware to correct bugs or apply new features. Delta files created according to exemplary embodiments of the present invention may also be applied to these home appliances, or to any device having firmware updateable by a delta file.

Exemplary embodiments of the present invention include an apparatus and method for providing stabilized binary differencing. Exemplary embodiments of the present invention are described below with respect to the ARM architecture developed and licensed by ARM Holdings, Inc. However, it would be understood that exemplary embodiments of the present invention may be adapted to other types of processor architectures.

FIG. 1 is a diagram of a mobile terminal according to an exemplary embodiment of the present invention.

Referring to FIG. 1, a mobile terminal 100 according to an exemplary embodiment of the present invention includes a processor 110, a storage unit 120, a display unit 130, a communication unit 140, and an input unit 150. According to exemplary embodiments of the present invention, the mobile terminal 100 may include additional and/or different units. Similarly, the functionality of two or more units may be integrated into a single component.

The processor 110 controls the overall operations of the mobile terminal 100 using firmware (not shown) stored in the storage unit 120. According to an exemplary embodiment of the present invention, the processor 110 may support the ARM architecture developed and licensed by ARM Holdings, Inc. In addition, when a delta file is received via the communication unit 140, the processor may implement the instructions in the delta file to update the firmware.

The storage unit 120 stores various files and other data in the mobile terminal. The storage unit may be understood as including several types of storages, such as a Random Access Memory (RAM) for storing user data, and storage for storing program data such as the firmware. The section for storage data may be flash memory, Read Only Memory (ROM), and the like.

The display unit 130 displays information to the user of the mobile terminal. The display unit 130 may be provided as a Liquid Crystal Display (LCD). In this case, the display unit 130 may include a controller for controlling the LCD, a video memory in which image data is stored and an LCD element. If the LCD is provided as a touch screen, the display unit 130 may perform a part or all of the functions of the input unit 160.

The communication unit 140 is configured to include an RF transmitter (not shown) for up-converting the frequency of transmitted signals and amplifying the transmitted signals, and an RF receiver (not shown) for low-noise amplifying of received RF signals and down-converting the frequency of the received RF signals. The communication unit 140 may also include a wired interface, such as Ethernet and/or Universal Serial Bus (USB).

The input unit 160 receives input from the user. The input unit 160 may be configured as a component of the display unit 130, as described above. The input unit 160 may also be configured as a keypad or a plurality of keys to receive input from the user.

When the firmware stored in the storage unit 120 is to be updated, a delta file is transmitted to the mobile terminal This process is known as Firmware Over The Air (FOTA). The delta file is typically obtained by executing a Binary Differencing Engine (BDE) to perform a binary comparison of the original firmware with the updated firmware. However, this process is time-consuming.

The BDE compares binary images (e.g. a binary image of the original and updated firmware) and prepares a set of delta instructions to cause the processor 110 to update the firmware in the storage unit 120 to the new version. The BDE conventionally performs its operations in a purely binary manner on the code itself. The process of matching updated code and identifying updated code is difficult.

For example, in the ARM architecture, branch and call instructions are position-relative. Even though chunks of identical code may shift (i.e., move up or down relative to one another), the code will not reflect any differences in local transfers of control. However, pointers to code and data are usually absolute pointers. This type of information has typically been hard to compare, because there was no indication as to whether the information was raw data or pointers.

These changes can be addressed through a process known as "reference" change tracking. The target locations for branch and call instructions are masked by a label, in order to allow the BDE to perform a comparison on the images.

Instead of executing a separate process to create labels and mask the branch/call instructions, the linker may be modified to output additional information to address this issue. For example, the linker may be modified to output a report about the components of the image. The linker may also be modified to output relocation information identifying, for each relocation (e.g., branch or call instruction), the kind of the relocation and a link to the symbol affected by the relocation.

If the linker outputs the relocation information, there is no need for reference change tracking. The output of the linker itself contains the relocation information identifying the original global symbol name, without the need for another label.

In addition, the linker may output a report indicating the location and attributes of all sections in the image. A section refers to a primary set of items that contribute to the image. These sections each include a number of attributes, such as their name, size, and location index within the object file that contributed the section. The report may include an index number of the section within the object file that provisioned the section. This index number is a unique number that the linker assigns to each section. The linker uses the index number to manage all of the sections in the image. The report may also include an additional column showing the physical address chosen by the linker for the section in the image. By extracting the lines of the report file, it is possible to match corresponding sections in the images.

The index number, together with the name and attributes of the sections, permit section matching between the current image (i.e., the image of the current version of the firmware) and the new image (i.e., the image of the updated version). In a typical running change, no new object files are added and no object files are deleted. Accordingly, perfect section matching between the current image and the new image usually occurs, although the deletion of old sections and the addition of new sections may also be accommodated.

The primary output of the linker is an ELF file. The ELF file contains all the binary output provided by the linker, including the binary image. The linker can also receive a parameter instructing the linker to provide relocation information in the output ELF file. The relocation information identifies each of the pointers in the image as such, enabling the BDE to distinguish between pointers and data. Accordingly, the BDE may use the relocation information to address differences caused by branch or call op-codes in the image.

FIG. 6 shows partial relocation information of an image according to an exemplary embodiment of the present invention.

Referring to FIG. 6, relocation information for a portion of an image is shown. Different types of relocations are used for code and pointers. In addition, code and local private data are frequently intermixed, with the code merely jumping around the included data. This combination of code and data can make the differencing operation difficult. However, the relocation information permits the BDE to more easily identify and operate in a fashion appropriate to these regions. While FIG. 6 shows a few different types of relocations for exemplary purposes, and ELF file may contain dozens of different types of relocations.

The report file may be used to generate a steering file containing information that can be used to match nearly all of the sections in the images. Accordingly, the steering file may be provided to the BDE to assist in the final binary comparison of the images.

Figure 2:
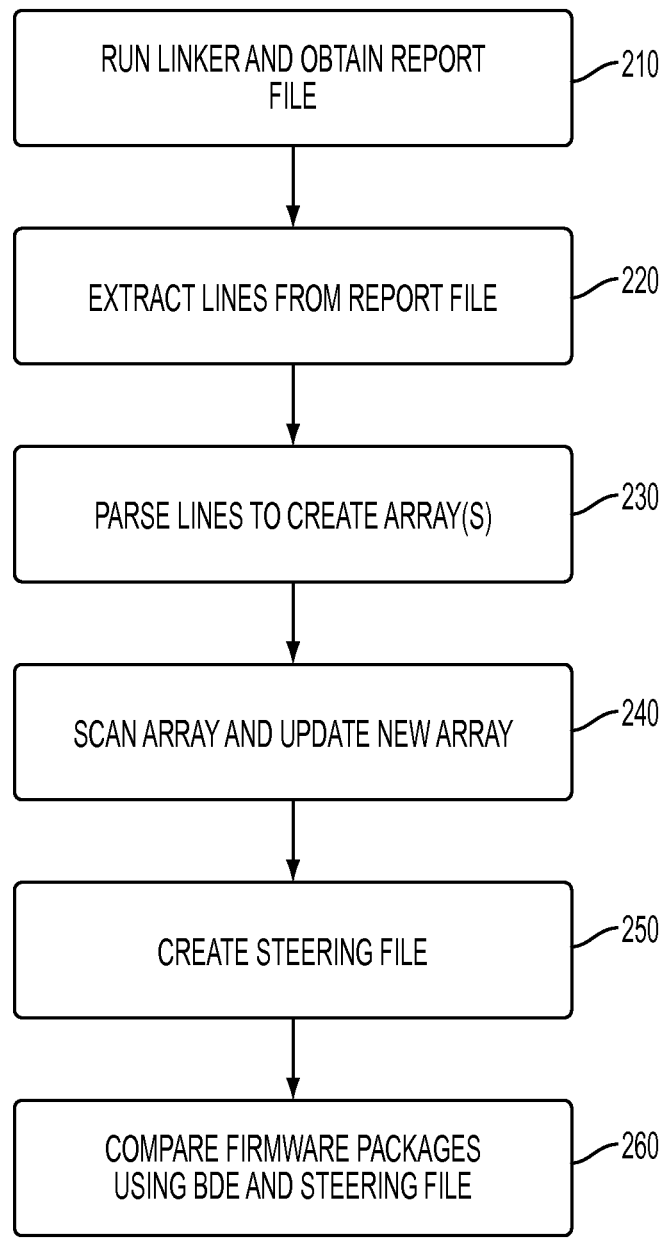
FIG. 2 is a flowchart of a method for generating a delta file according to an exemplary embodiment of the present invention.

FIG. 2 is a flowchart of a method for generating a delta file according to an exemplary embodiment of the present invention, and FIG. 3 shows a partial output of a linker according to an exemplary embodiment of the present invention.

Referring to FIGS. 2 and 3, the linker generates a report file in step 210. A partial output of the report file is shown in FIG. 3. The partial output includes a list of each section in the image, as well as additional information about the image. The additional information includes the size, type, attributes, and index information of each section. The output shown in FIG. 3 is only a partial output of the linker; the output may also include additional information not necessary for this process.

As shown in FIG. 3, the index information ("Idx") may include a three-digit number in which each digit is separated by a period, such as "2.0.1". The first digit in this sequence is the sequence of the file name on the command line given to the linker when the report file was prepared. The second digit is a sequence number of the module in the archive that provided the section. If the section corresponds to an object not found in an archive, the second digit may be 0. The third digit is the sequence number of the section in the ELF file. While ELF files may have several types of sections, the header of the ELF file will consistently choose the same section number for sections created by the same compiler.

In step 220, the report file is read and lines containing information needed by the BDE are extracted. Step 220 is described in more detail below with respect to FIG. 4. In step 230, the extracted lines are parsed to create an array of class objects describing each section in the image. Step 230 is described below with respect to FIG. 5.

Steps 210-230 are repeated for both the current image (i.e., the image corresponding to the current version of the firmware) and the new image (i.e., the image corresponding to the updated version of the firmware) to create an array corresponding to the current image and an array corresponding to the new image. The array corresponding to the current image is referred to as the BASE array, and the array corresponding to the new image is referred to as the INCREMENTAL array.

In step 240, the BASE array and the INCREMENTAL array are scanned in order, such as alphabetical order. The INCREMENTAL array is updated based on the results of the scan. Objects present in the BASE array but not the INCREMENTAL array are ignored. Objects in the INCREMENTAL array that have the same size as the corresponding object in the BASE array are marked in the INCREMENTAL array as "SAME". Objects in the INCREMENTAL array that have a different size than the corresponding object in the BASE array are marked in the INCREMENTAL array as "CHANGED", and the old size (found in the BASE array) is recorded in the INCREMENTAL object as BASE_SIZE (see Table 1 below).

In step 250, the resulting updated INCREMENTAL array is used to create a steering file. First, the INCREMENTAL array is sorted in ascending order according to the "Load Address" attribute, and a new array (referred to as LONGHORN) is generated based on the sorted INCREMENTAL array. The LONGHORN array is then converted into a text-based steering file. Each line in the steering file corresponds to an object entry in the LONGHORN array, and may include the information shown below in Table 1.

TABLE 1

| Attribute | Format | Example |
| --- | --- | --- |
| Marked Status | string | "NEW" or "SAME" or "CHANGED" |
| Load Address | 8 digit hex address | 0x00000000 |
| Size | 8 digit hex string | |
| Type | string | "Code", or "Data" |
| Attr | String | "RO", or "RW" |
| Exec Addr | 8 digit hex address | 0x00000000 |
| ARCHIVE | String, max length 255 | "alpha.ar", or "" empty string |
| OBJECT | String, max length 255 | "call.o" |
| IDX | String | "1.2.3" |
| BASE_SIZE | 8 digit hex string | For "NEW", or "SAME" status, insert the Size field value again |
| Section name | String, max length 255 | "C_code" |

Although much of the information in Table 1 can be seen in FIG. 3, the ARCHIVE and OBJECT attributes shown in Table 1 do not have a clear analog in FIG. 3. The value of the OBJECT attribute in Table 1 corresponds to the "Object" column shown in FIG. 3. The OBJECT may be a bare file name of the object, or may be a composite that also includes a reference to an archive where the object is located. For example, the string "call.o" indicates that the object is located in the file "call.o", while the string "alpha.o(alpha.ar)" indicates that the "alpha.o" object is located within the archive "alpha.ar". Accordingly, for composites, the object name is included in the OBJECT attribute, and the archive name is included in the ARCHIVE attribute. If no archive exists, the ARCHIVE attribute may be an empty string. Exemplary code for the object "call.o" is provided below:

```
Source    Code    for    Call.s
; Create a READONLY CODE section with name - genesis
        AREA      genesis,CODE, READONLY
; Make ReadMonth a global symbol accessible from other modules
        EXPORT    ReadMonth
        THUMB
; Declare three external references that linker needs to connect to
        IMPORT    ALPHA_ReadMonth
        IMPORT    BETA_ReadMonth
        IMPORT    DELTA_ReadMonth
ReadMonth
; Show three CALL instructions
        BL        ALPHA_ReadMonth
        BL        BETA_ReadMonth
        BL        DELTA_ReadMonth
; Show a JUMP instruction
        B         ReadMonth
        NOP
        AREA      greeting,DATA, READONLY
; Read-only string data in section -- greeting
Alien
        DCB       "Hello World "
        AREA      pointers,DATA, READONLY
Point_code
; Read-only 32 bit absolute pointer to CODE in section -- pointer
        DCD       ReadMonth
; Read-only 32 bit absolute pointer to DATA in section -- pointer
        DCD       Alien
        AREA      flash_code_in_ram,CODE,READWRITE
        BL        BETA_ReadMonth
        B         ReadMonth
        AREA      answer,DATA, READWRITE
        DCB       "Greetings, UFO "
          AREA    galaxy,DATA, NOINIT
        SPACE 2000
          END
```

As can be seen from the above source code, the object "call.o" defines four sections: "genesis", "greeting", "flash_code_in_ram", and "galaxy". The corresponding lines for each of these sections in the report file refers to "call.o" as the object in which these sections occur, as shown in FIG. 3.

In step 260, the steering file is provided to the BDE along with ELF files corresponding to the current and new images. As described above, the ELF files may include the relocation information. The BDE compares the images using the steering file.

The BDE dissects the current and new images according to the information in the steering file. The BDE may identify similar sections in both the current and new images (e.g., sections having the same name and/or index number), and may divide the image up according to the sections identified in the steering file. Since the output of the linker is stabilized, the BDE may assume that code in a particular section of the current image is highly similar to code in a corresponding section of the new image, especially if the steering file indicates that the two sections are the same (e.g., not changed or new). Accordingly, the BDE employs the steering image to break down the images so as to reduce processing time.

In addition, the BDE employs the relocation information included in the ELF files to identify segments of the image. As mentioned above, the relocation information allows the BDE to identify a particular location as "code" or as "data". If a particular relocation is present in corresponding modules of both the current and new images, the BDE can make assumptions about this similar nature. Similarly, if the relocation information indicates that the relocation relates to code or data, this information permits the BDE to treat the relocation in a manner appropriate for each type.

The BDE generates a minimal delta file reflecting the differences between the current and new images based on the steering file and the current and new images. The delta file may be provided to the mobile terminal 100 via FOTA to enable the processor 110 to update the firmware stored in the storage unit 120.

Figure 4:
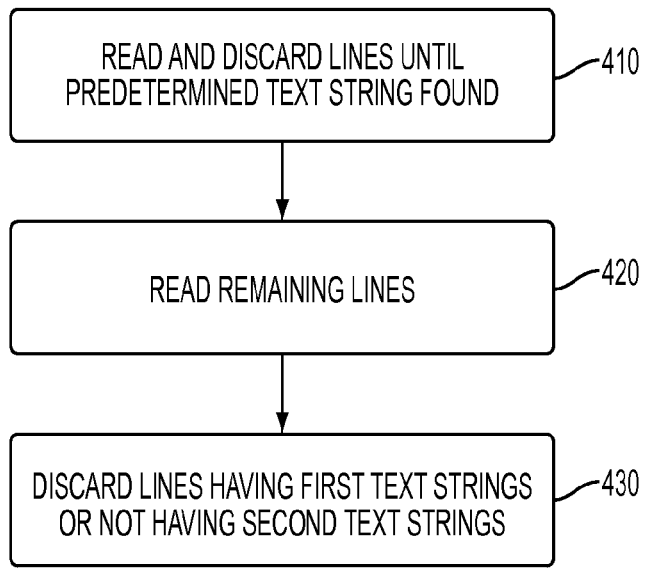
FIG. 4 is a flowchart of a method for extracting lines from a report file according to an exemplary embodiment of the present invention.

FIG. 4 is a flowchart of a method for extracting lines from a report file according to an exemplary embodiment of the present invention. The operations shown in FIG. 4 may correspond to the step 220 described above with respect to FIG. 2.

Referring to FIG. 4, in step 410, each line from the report file (also referred to as a map file) is read and discarded until a predetermined text string is read. These discarded lines typically include information that is not needed by the BDE or that does not relate to the sections of the image, and are thus discarded. The predetermined text string indicates the start of the information used by the BDE. While the particular predetermined text string may vary, an exemplary text string may be "Memory Map of the image", as shown in FIG. 3.

In step 420, the remaining lines of the report file are read. In step 430, some of the lines are discarded. The discarded lines may be identified as having first predetermined text strings. In addition, lines that do not have second predetermined text strings may also be discarded. The presence of the first predetermined text strings may indicate that the information on the line is not needed by the BDE. Similarly, the absence of the second predetermined text string may indicate that the information is not needed by the BDE.

As shown in FIG. 3, several lines of the report file include explanatory information describing the information in the file or other information that the BDE does not need. For example, the line 310 merely describes the information in each column. Since the information about the sections themselves would include, as the initial characters of the column, the string "0x" identifying an address, any line that does not begin with this string may be displayed. Accordingly, an exemplary first predetermined text string may include "Zero RW", and an exemplary second predetermined text string may include "0x". The resulting lines can be converted into an array of object information as described below with respect to FIG. 5.

Figure 5:
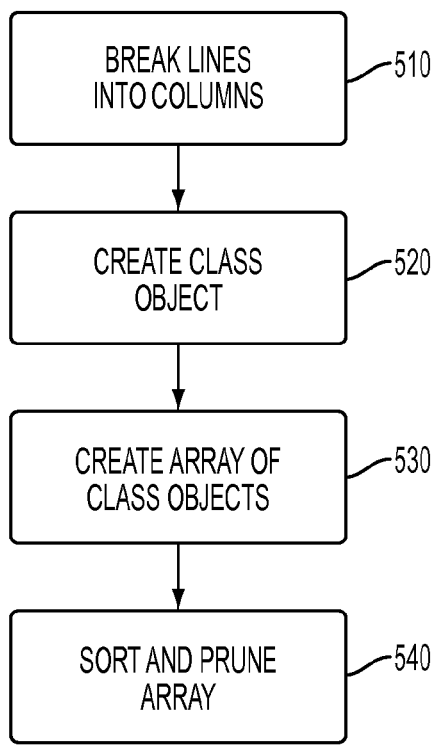
FIG. 5 is a flowchart of a method for parsing lines extracted from a report file according to an exemplary embodiment of the present invention.

FIG. 5 is a flowchart of a method for parsing lines extracted from a report file according to an exemplary embodiment of the present invention.

Referring to FIG. 5, in step 510, each line is broken into columns based on a predetermined separator. The predetermined separator may be, for example, a space or series of spaces. In addition, certain values in each line that are not needed by the BDE may be ignored and treated as a space. For example, in the report files generated by the linkers, the entry point of the image may be represented by a character such as an asterisk (*). As this information is not needed by the BDE, the character (e.g., asterisk) may be ignored and treated as a space.

In step 520, a class object is created for each line. The class object includes a plurality of text strings, each corresponding to a column in the line. In step 530, the class objects are combined into an array of class objects (e.g., the BASE and INCREMENTAL arrays described above). Since each line corresponds to a section, each class object also corresponds to the same section. A class object denotes a grouping of specific data, and has a specific meaning in certain programming languages, such as C++ and Python. However, other programming languages may have a similar structure used to collect related data together. For example, in the C programming language, the term 'structure' is used for this purpose. Accordingly, although the term 'class object' is used herein, a similar grouping concept may be extended to include any meaningful collection of information in any programming language.

In step 540, the array is sorted and pruned. The array may be sorted according to the values of the ARCHIVE, OBJECT, Index, Type, Attribute, and Size. Class objects having the same archive and object names may be removed. This is because in some cases, the map file may not show the path to the archive or object files, and duplicate files may be provisioned from different directories. The resulting array is used to generate the steering file used by the BDE, as described above with respect to FIG. 2.

Exemplary embodiments of the present invention can also be embodied as computer readable code on a computer readable recording medium. A computer readable recording medium is any tangible information storage device that can store information which can be thereafter read by a computer system. Examples of the computer readable recording medium include ROM, RAM, CD-ROMs, DVDs, magnetic tapes, floppy disks, and optical data storage devices. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a delta file, the method comprising:
   obtaining a first report file for a first image corresponding to a current firmware version and a second report file for a second image corresponding to an updated firmware version, each report file containing information about a plurality of sections of the corresponding image;
   generating a first object array corresponding to the first report file and a second object array corresponding to the second report file;
   comparing the first object array to the second object array;
   updating the second object array to reflect the results of the comparison;
   generating a steering file based on the updated object array;
   performing a binary differencing on the first image and the second image based on the steering file; and
   generating a delta file based on the binary differencing.

2. The method of claim 1, wherein the obtaining of the first report and the second report comprises:
   running a linker to output the first report file, the linker accepting as input a plurality of parameters and code corresponding to the first image; and
   running the linker to output the second report file, the linker accepting as input the plurality of parameters and code corresponding to the second image.

3. The method of claim 1, wherein the generating of the first and second object array comprises, for each object array:
   parsing the report file corresponding to the object array so as to obtain a plurality of lines including information about the plurality of sections of the corresponding image; and
   generating an object array in which each element of the object array corresponds to one of the plurality of lines.

4. The method of claim 3, wherein each line of the plurality of lines includes information about a corresponding section in the corresponding image, and
   wherein the information includes:
      an execution address of the corresponding section,
      a load address of the corresponding section,
      a size of the corresponding section,
      a type of the corresponding section,
      an index number of the corresponding section,
      a name of the corresponding section,
      an object where the corresponding section is located, and
      when the object is located in an archive, the archive where the corresponding object is located.

5. The method of claim 3, wherein the parsing of the report file comprises:
   discarding lines of the report file until a first predetermined string is reached;
   discarding remaining lines of the report file that include a second predetermined string; and
   discarding remaining lines of the report file that do not include a third predetermined string.

6. The method of claim 3, wherein the generating of the object array comprises:
   breaking each of the plurality of lines into a plurality of columns according to at least one separator character;
   for each of the plurality of lines, creating a class object including a plurality of variable-length strings, each of the variable-length strings corresponding to one of the plurality of columns;
   generating the object array including each of the class objects;
   sorting the object array; and
   removing duplicate class objects in the object array.

7. The method of claim 6, wherein the plurality of columns comprises:
   a column indicating an execution address of a corresponding section;
   a column indicating a load address of the corresponding section;
   a column indicating a size of the corresponding section;
   a column indicating attributes of the corresponding section;
   a column indicating an index number of the corresponding section;
   a column indicating a name of the corresponding section;
   a column indicating a type of the corresponding section;
   a column indicating an object where the corresponding section is located; and
   a column indicating whether the object is located in an archive, and when the object is located in an archive, indicating a name of the archive.

8. The method of claim 1, wherein the updating of the second object array comprises:
   marking an object in the second object array as NEW, if no corresponding object exists in the first object array;
   marking an object in the second object array as SAME, if a corresponding object exists in the first object array and has the same size as the object in the second object array; and marking an object in the second array as CHANGED, if a corresponding object exists in the first array but has a different size than the object in the second array.

9. The method of claim 1, wherein the generating of the steering file comprises:
sorting the updated object array based on a load address of each object in the updated object array; and
creating the steering file as a text file in which each line of the steering file corresponds to an object in the updated object array.

10. The method of claim 9, wherein each line of the steering file includes:
information indicating whether an object corresponding to the line of the steering file is NEW, SAME, or CHANGED;
information about a load address of the corresponding object;
a size value of the corresponding object;
attributes of the corresponding object;
an execution address of the corresponding object;
archive information of the corresponding object;
object information of the corresponding object;
index information of the corresponding object; and
a base size of the corresponding object,
wherein the base size of the corresponding object is the same as the size value when the corresponding object is NEW or SAME.

11. The method of claim 1, wherein the performing of the binary differencing comprises:
performing the binary differencing on the first image and the second image based on the steering file and on relocation information contained in the first image and the second image.

12. The method of claim 1, wherein the updating of the second object array comprises marking an object in the second object array as NEW, if no corresponding object exists in the first object array.

13. The method of claim 1, wherein the updating of the second object array comprises marking an object in the second object array as SAME, if a corresponding object exists in the first object array and has the same size as the object in the second object array.

14. The method of claim 1, wherein the updating of the second object array comprises marking an object in the second array as CHANGED, if a corresponding object exists in the first array but has a different size than the object in the second array.

15. The method of claim 1, wherein the generating of the steering file comprises sorting the updated object array based on a load address of each object in the updated object array.

16. The method of claim 1, wherein the generating of the steering file comprises creating the steering file as a text file in which each line of the steering file corresponds to an object in the updated object array.

* * * * *